United States Patent
Tomczak

(10) Patent No.: US 6,604,736 B1
(45) Date of Patent: Aug. 12, 2003

(54) SPRING ASSEMBLY WITH CAPTURED CORE

(75) Inventor: Brian R. Tomczak, Milwaukee, WI (US)

(73) Assignee: Barnes Group Inc., Bristol, CT (US)

( * ) Notice: Subject to any disclaimer, the term of this patent is extended or adjusted under 35 U.S.C. 154(b) by 46 days.

(21) Appl. No.: 10/067,361

(22) Filed: Feb. 7, 2002

(51) Int. Cl.[7] ................................................. F16F 1/06
(52) U.S. Cl. ...................................... 267/169; 267/180
(58) Field of Search ............................... 267/169, 168, 267/179, 166, 166.1, 167, 174, 180

(56) References Cited

U.S. PATENT DOCUMENTS

| | | | |
|---|---|---|---|
| 87,827 A | * | 3/1869 | Dand ........................ 267/166.1 |
| 3,482,462 A | * | 12/1969 | Dahlem ........................ 267/167 |
| 3,625,502 A | * | 12/1971 | Joerres ........................ 267/167 |
| 3,882,341 A | | 5/1975 | Green |
| 6,264,183 B1 | | 7/2001 | Meier |
| 6,409,160 B2 | * | 6/2002 | Meier et al. ................. 267/169 |
| 6,533,259 B2 | * | 3/2003 | Devambe .................... 267/166 |

* cited by examiner

Primary Examiner—Christopher P. Schwartz
Assistant Examiner—Melanie Torres
(74) Attorney, Agent, or Firm—Fay, Sharpe, Fagan, Minnich & McKee

(57) ABSTRACT

A spring assembly comprising: an axially extending coil formed from a spring wire and having first and second ends and a length there between with an interior having a generally circular cross-section. The coil includes first end portion with a first diameter and extending inwardly from the first end, a second end portion with a second diameter and extending inwardly from the second end and a center portion with a third diameter between the end portions of the coil. An elongated core is placed within the interior of the coil at the center portion and two spaced lugs formed from the spring wire and extending chordally across the circular cross-section capture the core in the center portion.

42 Claims, 1 Drawing Sheet

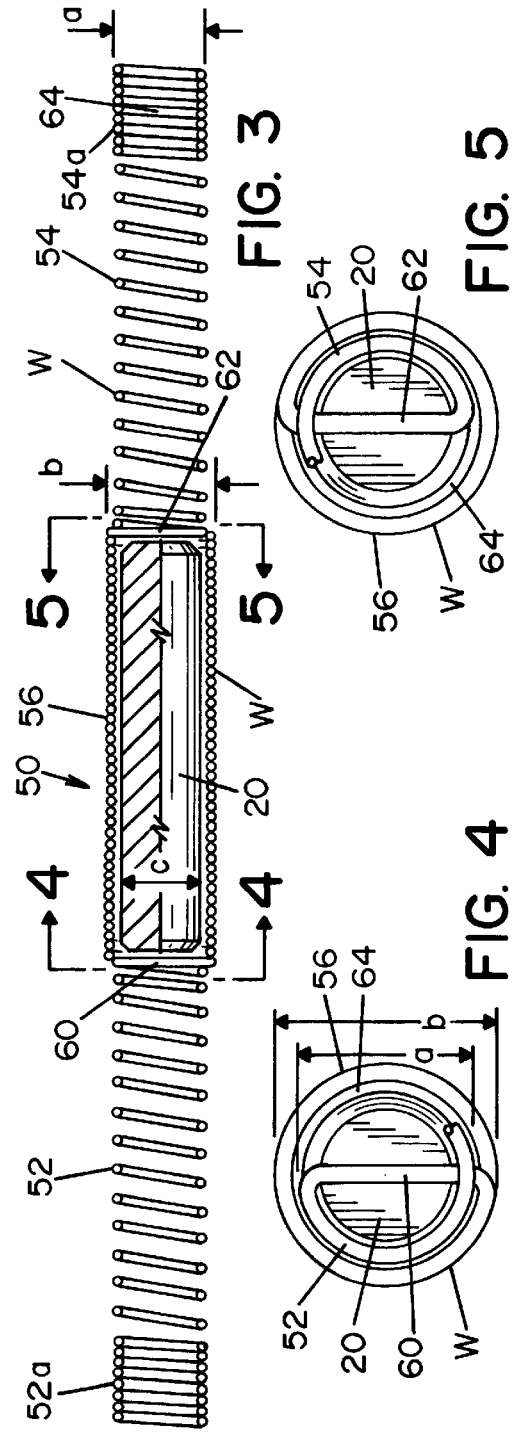

SPRING ASSEMBLY WITH CAPTURED CORE

The present invention relates to the art of cored spring assemblies of the type formed from a continuously coiled spring wire and more particularly to an elongated spring assembly with a core captured in the center of the assembly for dampening electromagnetic energy.

INCORPORATION BY REFERENCE

The present invention is an improvement over the cored spring assembly disclosed in Meier U.S. Pat. No. 6,264,183. This prior patent includes not only a description of the type of cored spring assembly to which the present invention is directed, but also spring coiling machines for producing the assembly. This patent together with the various patents on spring coiling machines set forth in the introductory portion of that patent are incorporated by reference herein. The particular coiling machine for producing the present invention is well known and may be of the type that coils spring wire from the back of the machine, as shown in Meier U.S. Pat. No. 6,264,183, or from the side of the machine. Many coiling machines can be used to make the present invention. Meier U.S. Pat. No. 6,264,183 shows the prior art spring assembly, together with various coiling machines to make such assembly.

Also incorporated by reference herein is Green U.S. Pat. No. 3,882,341 disclosing a cored coiled spring assembly with reduced diameter end portions capturing the core in the center of the assembly. This cored spring assembly is essentially the same as the spring assembly shown in Meier U.S. Pat. No. 6,264,183 and is incorporated by reference herein as background.

BACKGROUND OF INVENTION

The cored spring assemblies shown in Meier U.S. Pat. No. 6,264,183 and Green U.S. Pat. No. 3,882,341 are for use in an internal combustion ignition systems to dampen electromagnetic energy generated by the ignition system. The prior art spring assemblies include a ferrite or ferromagnetic core, inserts or plug held in the center of a single continuous coiled spring. The insert or core is maintained in place within the center of the assembly by merely reducing the diameter of the coiled spring being formed by the coiling machine at opposite ends of the center portion. The reduced diameter sections are intended to capture the core. This type of coiling operation makes the diameters of the reduced diameter portions on opposite sides of the core quite critical. If an undersized core is used, the reduced diameter portions can not assure that the core is captured and maintained in the center of the assembly. Furthermore, if the core wears on the reduced diameter portions, there is a possibility that the capturing of the core is compromised.

SUMMARY OF THE INVENTION

The present invention is directed to an elongated spring assembly with a core, as defined above, wherein the centered core is captured by lugs on opposite sides of the core. These lugs are formed from the wire used to coil the spring in the coiling machine. By interrupting the coiling of the spring wire and deforming a length of the wire to extend in a chordal direction across the central passage of the coiled wire a first lug is formed. Thereafter, the coiling machine coils a large diameter center portion to receive the core. At the end of the center portion surrounding the core, the coiling machine is again manipulated to bring a second length of wire across the passage at the end of the core. Then, the coiling operation continues to complete the assembly. In practice, the two end portions of the coil have a slightly smaller diameter than the center diameter that surrounds the core. The lugs at each end of the center portion are chordally disposed across the internal passage of the spring to positively capture the core within the center portion of the spring. Consequently, the coiling action first coils an end portion of the spring assembly. A length of wire is then drawn chordally across the passage of the spring. Thereafter, a larger diameter of the coil assembly is coiled by the coiling machine. This larger diameter receives the centered insert or core. Then the coiling machine hesitates and draws another length of wire chordally across the internal passage. The remaining end is coiled in accordance with normal practice. Consequently, the coil assembly has end portions with one diameter and a center portion with a large diameter. In practice, the core is cylindrical and has an outer diameter less than the internal diameter of the passage in both the end portions and the center portion. These diameters are specifications of the end user. As these specified diameters are greater than the core, the present invention has a distinct advantage. The chordally extending lugs are across the center passage of the spring assembly. This positively captures the core in the center of the assembly, even though the core could possibly slip through the end portions of the assembly. Reduced diameters do not positively block movement of the core.

In accordance with the present invention there is provided a spring assembly comprising an axially extending coil formed from a spring wire and having first and second ends and a length there between. The coil has a passage with a generally circular cross-section. The coil includes a first end portion with a first diameter and extending inwardly from the first end, a second end portion with a second diameter and extending inwardly from the second end, and a third center portion with a third diameter between the end portions. An elongated ferromagnetic core is positioned within the passage of the coil at the center portion and two spaced lugs are provided on opposite ends of the center portion. The lugs are formed from a short length of the same wire and join the center coiled portion with the end coiled portions. These lugs extend chordally across the cross-section of the center passage to capture the core in the center coiled portion.

In accordance with another aspect of the present invention, the two end portions have the same diameter, whereas the center portion has a larger diameter to facilitate the ferromagnetic core. The chordal lugs preferably extend diagonally across the center passage of the coiled spring assembly to positively capture the core in the center of the spring assembly.

In accordance with another aspect of the present invention there is provided a method of making a cored spring assembly. The method comprises coiling spring wire into a first diameter to define a central passage with a circular cross-section. Then, the coiler draws a length of the wire chordally across the passage to define a first lug. Thereafter, the coiling of the wire continues to form a second diameter center portion with a cavity or center passage. During formation of the center portion, or after the formation, the method includes inserting an elongated ferromagnetic core into the cavity. Thereafter, a second length of wire is drawn chordally across the passage to capture the core in the cavity. Forming of the second lug is followed by coiling the wire into a diameter generally equaling the first diameter to complete the spring assembly. This method is performed by standard spring coiler machine that is hesitated during the coiling operation to draw a length of wire, as a lug, across the center of the coil assembly to positively prevent the core from moving axially from the center of the spring assembly. Of course, "center" means intermediate and not actually at the midpoint of the assembly.

The primary object of the present invention is the provision of a cored coil spring assembly including lugs on opposite sides of the core to hold the core within the assembly.

Another object of the present invention is the provision of a cored spring assembly, as defined above, which spring assembly positively captures the core in the center portion of the spring assembly to prevent any possibility of axial displacement.

Still a further object of the present invention is the provision of a cored spring assembly, as defined above, which spring assembly can replace the spring assembly shown in Meier U.S. Pat. No. 6,264,183 with a more positive capturing of the centered core.

Still another object of the present invention is the provision of a method of making a cored coil assembly, which method merely coils the assembly and hesitates the coiling process at two spaced locations on opposite sides of the center portion to form lugs that capture the core in the assembly.

These and other objects and advantages will become apparent from the following description taken together with the accompanying drawings.

BRIEF DESCRIPTION OF DRAWINGS

FIG. 1 is a cross-sectional view of the prior art coil assembly with a centered core;

FIG. 2 is a side elevational view of the preferred embodiment of the present invention;

FIG. 3 is a cross-sectional view taken generally along line 3—3 of FIG. 2 with the core not fully cross-sectioned;

FIG. 4 is an enlarged cross-sectional view taken generally along line 4—4 of FIG. 3; and, FIG. 5 is an enlarged cross-sectional view taken generally along line 5—5 of FIG. 3.

PREFERRED EMBODIMENT

Referring now to the drawings, wherein the showings are for the purpose of illustrating the preferred embodiment of the invention only and not for the purpose of limiting same, FIG. 1 shows the prior art as disclosed in Meier U.S. Pat. No. 6,264,183. This prior art includes a cored spring assembly including axially spaced end portions 12, 14, each terminating in closed convolutions 12a, 14a. A center portion 16 has a diameter b greater than the diameter a of end portions 12, 14. This center portion includes closed convolutions to encircle the cylindrical ferromagnetic core 20. In this prior art, diameter a of end portions 12, 14 is slightly smaller than the diameter b of center portion 16. Cylindrical core 20 includes an external diameter c, which diameter is smaller than both diameter a and diameter b. Thus, the core of the prior art can move axially through assembly 10. To prevent this displacement, the prior art includes reduced diameter portions 30,32 having an internal diameter d, less than the outer diameter c of cylinder core 20. These reduced diameter portions are formed by the coiling machine so one or more circular convolutions at the spaced ends of center portion 16 hold core 20 centered in assembly 10. Disadvantages of this prior art capturing technique are overcome by the present invention as illustrated in FIGS. 2–5.

In accordance with the invention, there is provided an improved axially extending cored coil spring assembly 50 having the specification driven dimensions of the prior art. The new cored spring assembly, as shown in FIGS. 2–4, includes an axially extending coil formed by wire W to include spaced end portions 52, 54 with closed convolutions 52a, 54a at the opposite ends of the assembly. Center portion 56 is formed by closed convolutions and has diameter b. The previously described ferromagnetic core 20 is formed from ferrite or iron and is the same as the core in the prior art. Core 20 is held in center portion 56 by chordal lengths of wire W shown as lugs 60, 62 extending chordally through the central opening or passage 64. In the preferred embodiment, as shown in FIGS. 4 and 5, the spaced lengths of wire W extend diametrically through passage 64, which passage has a circular cross-section. Chordally extending lugs or wire lengths 60, 62 are on opposite ends of center portion 56 to capture core 20 in the center of the assembly. In the preferred embodiment, lugs 60, 62 extend from opposite sides of the coil to continue the coiling process. This is shown in FIGS. 4 and 5. By capturing core 20 in the spring assembly with spaced chordal lengths of the wire W, instead of merely reducing the diameter of the coil, core 20 is held positively in the assembly. No matter what diameter or change in shape of the core, the core is still held within the assembly and can not be displaced through end portions 52, 54.

A variety of coiling machines are used to produce cored spring assembly 50. The machines for making the prior art is one such machine. Preferably, the spring is coiled parallel to the face of the coiling machine to extend diametrically from the center of the machine. This machine used is an ITAYA MCX20 with a built in feeder. When using this type of machine, it is easier to insert core 20 while the coiling operation is taking place. In accordance with the method of the present invention, the closed convolutions 52a are made by a standard coiling machine followed by like diameter convolutions that are spaced apart to complete end portion 52 with diameter a. Thereafter, the coiling machine hesitates and draws a length of wire W across center passage 64. The coiling machine then continues with closed convolutions in portion 56, while core 20 is inserted. In practice, center portion 56 is formed by the coiling machine. Then core 20 from a vibratory bowl feeder is pushed into the coil by a feeder element. After the center portion has been formed by closed convolutions and the core is in place, the coiling machine again hesitates and draws a length of wire W across the center passage 64 to capture the core. Portion 56 has a larger diameter than portion 52. This smaller diameter is repeated at portion 54 which terminates in closed convolutions 54a. Chordal lugs 60, 62 are illustrated as being diametrically through the center passage of the spring assembly. Of course, they could extend at different angles. They do not need to be aligned in a radial direction during the coiling operation. This reduces the coiling complexity of assembly 50.

Having thus defined the invention, the following is claimed:

1. A spring assembly comprising: an axially extending coil formed from a spring wire and having first and second ends and a length there between with an interior having a generally circular cross-section, said coil including first end portion "a" with a first diameter and extending inwardly from said first end, a second end portion with a second diameter and extending inwardly from said second end and a center portion with a third diameter between said end portions; an elongated core within said interior of said coil at said center portion; and, two spaced lugs on opposite ends of said center portion, said lugs being formed from said spring wire to join said center portion with said end portions and extended chordally across said circular cross-section to capture said core in said center portion.

2. A spring assembly as defined in claim 1 wherein said first diameter is generally equal to said second diameter.

3. A spring assembly as defined in claim 2 wherein said third diameter of said center portion is greater than said first and second diameters.

4. A spring assembly as defined in claim 1 wherein said third diameter of said center portion is greater than said first and second diameters.

5. A spring assembly as defined in claim 4 wherein said core is cylindrical.

6. A spring assembly as defined in claim 3 wherein said core is cylindrical.

7. A spring assembly as defined in claim 1 wherein said core is cylindrical.

8. A spring assembly as defined in claim 7 where at least one of said core capturing lugs extends generally diametrically across said cross-section.

9. A spring assembly as defined in claim 8 wherein both of said core capturing lugs extend generally diametrically across said cross-section.

10. A spring assembly as defined in claim 6 where at least one of said core capturing lugs extends generally diametrically across said cross-section.

11. A spring assembly as defined in claim 10 wherein both of said core capturing lugs extend generally diametrically across said cross-section.

12. A spring assembly as defined in claim 5 where at least one of said core capturing lugs extends generally diametrically across said cross-section.

13. A spring assembly as defined in claim 12 wherein both of said core capturing lugs extend generally diametrically across said cross-section.

14. A spring assembly as defined in claim 2 where at least one of said core capturing lugs extends generally diametrically across said cross-section.

15. A spring assembly as defined in claim 14 wherein both of said core capturing lugs extend generally diametrically across said cross-section.

16. A spring assembly as defined in claim 1 where at least one of said core capturing lugs extends generally diametrically across said cross-section.

17. A spring assembly as defined in claim 16 wherein both of said core capturing lugs extend generally diametrically across said cross-section.

18. A spring assembly as defined in claim 17 wherein said core facilitates dampening of electromagnetic energy.

19. A spring assembly as defined in claim 18 wherein said core is ferromagnetic.

20. A spring assembly as defined in claim 16 wherein said core facilitates dampening of electromagnetic energy.

21. A spring assembly as defined in claim 20 wherein said core is ferromagnetic.

22. A spring assembly as defined in claim 7 wherein said core facilitates dampening of electromagnetic energy.

23. A spring assembly as defined in claim 22 wherein said core is ferromagnetic.

24. A spring assembly as defined in claim 4 wherein said core facilitates dampening of electromagnetic energy.

25. A spring assembly as defined in claim 24 wherein said core is ferromagnetic.

26. A spring assembly as defined in claim 1 wherein said core facilitates dampening of electromagnetic energy.

27. A spring assembly as defined in claim 26 wherein said core is ferromagnetic.

28. A spring assembly as defined in claim 26 wherein said end portions include closed convolutions adjacent said ends.

29. A spring assembly as defined in claim 28 wherein said center portion includes closed convolutions.

30. A spring assembly as defined in claim 26 wherein said center portion includes closed convolutions.

31. A spring assembly as defined in claim 2 wherein said end portions include closed convolutions adjacent said ends.

32. A spring assembly as defined in claim 31 wherein said center portion includes closed convolutions.

33. A spring assembly as defined in claim 2 wherein said center portion includes closed convolutions.

34. A spring assembly as defined in claim 1 wherein said end portions include closed convolutions adjacent said ends.

35. A spring assembly as defined in claim 34 wherein said center portion includes closed convolutions.

36. A spring assembly as defined in claim 1 wherein said center portion includes closed convolutions.

37. A method of making a cored coil spring assembly, said method comprising:
  (a) coiling spring wire into a first diameter to define an end portion with a central passage with a circular cross-section;
  (b) drawing a length of said wire chordally across said passage to define a first lug;
  (c) then coiling said wire into a second diameter center portion with a cavity matching said passage;
  (d) inserting an elongated ferromagnetic core into said cavity as it is being formed or after it has been formed;
  (e) then drawing a second length of wire chordally across said passage.

38. A method as defined in claim 37 including:
  (f) thereafter coiling said wire into a second end portion.

39. A method as defined in claim 38 wherein said coiling of said end portions is closed convolutions adjacent said ends.

40. A method as defined in claim 39 wherein said coiling of said center portion is closed convolutions.

41. A method as defined in claim 38 wherein said coiling of said center portion is closed convolutions.

42. A method as defined in claim 37 wherein said coiling of said center portion is closed convolutions.

* * * * *